United States Patent [19]

Labrador

[11] Patent Number: 5,052,902

[45] Date of Patent: Oct. 1, 1991

[54] WATER-WAVE-ENERGY CONVERTER

[76] Inventor: Gaudencio A. Labrador, 10760 Gabacho Dr., San Diego, Calif. 92124

[21] Appl. No.: 820,082

[22] Filed: Jan. 21, 1986

Related U.S. Application Data

[63] Continuation-in-part of Ser. No. 631,322, Jul. 19, 1984, abandoned.

[51] Int. Cl.$^5$ .............................................. F04B 35/00
[52] U.S. Cl. ........................................ 417/330; 60/506
[58] Field of Search ............... 417/330, 332, 268, 259, 417/264, 266; 60/506; 290/53

[56] References Cited

U.S. PATENT DOCUMENTS

| | | | |
|---|---|---|---|
| 411,252 | 9/1889 | Metzger | 417/259 |
| 1,061,091 | 5/1913 | Lewis | 417/330 |
| 1,887,316 | 11/1932 | Lockfaw | 417/330 |
| 2,028,331 | 1/1936 | Jänicke | 417/268 |
| 2,423,720 | 7/1947 | Müllejans et al. | 417/268 |
| 3,190,545 | 6/1965 | Weber et al. | 417/268 |
| 3,809,507 | 5/1974 | Baglai | 417/259 |
| 4,087,209 | 5/1978 | Máhig et al. | 417/268 |
| 4,111,609 | 9/1978 | Braun | 417/267 |
| 4,115,034 | 9/1978 | Smith | 417/534 |
| 4,160,624 | 7/1979 | Smith | 417/330 |
| 4,358,254 | 11/1982 | Hannibal | 417/419 |
| 4,544,331 | 10/1985 | Shibuya | 417/269 |

FOREIGN PATENT DOCUMENTS 219873  8/1924  United Kingdom ............... 417/259

Primary Examiner—Leonard E. Smith

[57] ABSTRACT

What has been invented is a machine constructed according to the apparatus illustrated by FIG. 6 in Sheet 5/9, set out floating on the ocean to convert the energy of the water waves into storable and consumable energies, such as, compressed air, etc, comprising:

(a) A Multi-Stage Piston Compressor, as per FIG. 1 and FIG. 2, which is a composition of several cylinders joint end after end, decreasing in diameter by end after end, having a piston with one-way valves in each cylinder, having one-way valves on every partition wall between cylinders, a single long piston rod common to all cylinders that moves each of the pistons synchronically to push the compressed air towards its smaller end;

(b) A Power Board System as per FIG. 3, having an impact wall being pushed by the waves, which in turn operates said compressor thru pendulum bars that yield to oversized waves thru a hydraulic jack connector;

(c) A 90% submerged floater comprising a pair of parallel sets of pipes assembled one on top of the other, having a length of more than one wavelength, which floats the said Power-Board-Compressor assembly;

(d) A pair of cylindrical air tank coupled by a deck on top that carry four said compressors operated thru a bar that stay vertical by a weight at its lower tip by oscillation of the tanks.

2 Claims, 9 Drawing Sheets

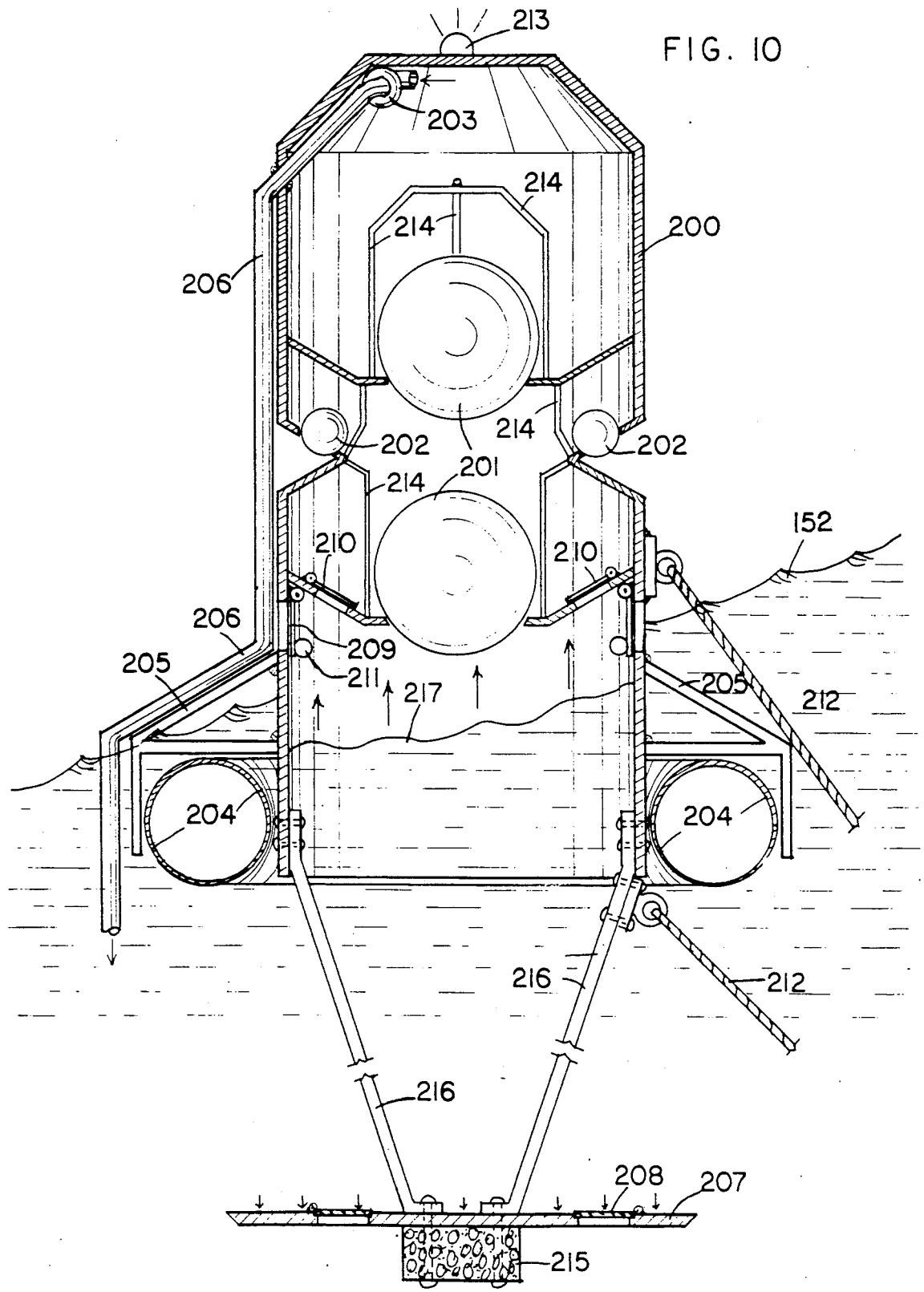

WATER-WAVE-ENERGY CONVERTER

Continuation-in-Part of 06/631,322; July 19, 1984, now abandoned.

BACKGROUND OF THE INVENTION

I. Field of the Invention

Being a major factor in maintaining or improving the economy of every country of the world, energy, most particularly the oil form, has been imposing more and more critical problems to all nations, it being a disappearing material aside from being a polutant and not available to all nations. Nuclear energy, aside from being costly and unsafe, is not also available to all nations. To ease these problems, efforts had been more exerted than ever to explore and make use of the alternative and regenerative energies that do not use the fuel oil, such as, the wind, the solar, the ocean energy, and the municipal wastes.

In this invention, particular attention is concentrated on the maximum harnessing of the ocean waves in the maximum effeciency and effectiveness of energy convertion out of whatever size or amplitude of available water-wave that arrives at the structure to actuate the energy converter system. It is also the objective of this invention to maximize production of consumable energy (compressed air, electricity, or hydrogen gas) out of the water-waves at any weather condition, and at any location of the body of water or any part of the ocean, in the most simple and safest way, and in the least cost of construction and least cost of maintenance with high durability.

II. Description of Prior Art

A. Referring to U.S. Pat. No. 4,160,624, dated July 10, 1979 "Water Vehicle-Actuated Air Compressor and Systems Therefor" by Smith, the paddles, which are submerged at the bottom of the barge, are actuated by the tilting and oscillation movements of the barge and not by the direct impact of the waves. This kind of design of an energy converter works only with the modulated water waves, so it must be placed away from rough seas and away from the beaches where the surfs stand up and break, otherwise, the whole system will be destroyed, or build the system into a very heavy out of proportion structure. This air compressor by Smith can work to some extent but without much expectation of its performance because there are glaring drawbacks and limitations, such as, the following:

1. The floating barge in open sea will be tossed up and down causing wear and tear, and reducing the durability and efficiency of all the parts. Actually it will require a very heavy structure of construction to withstand the stresses imparted by the big surf specially during violent weather. The anchor chain must be strong enough to hold the barge against the heavy impact of the surf on the wide side of the barge. In the same manner, the structures holding the anchor chain must be strong enough to keep holding the chain, otherwise, the whole barge will be torn apart into peices. It therefor requires a very high cost of construction to withstand the forces of the waves during violent weather. This will result to a very low ratio of energy production against cost of construction and maintenance.

2. As per construction of the barge and the relative quantities and sizes of the paddles together with the steel compressed air tank and other machineries loaded on the barge, most of the energy brought in by the incoming water-wave will be spent splashing on the side of the barge and in tossing-up the heavy structure barge. Therefor, only a very small percentage of the energy offered by the waves is use to actuate the paddles.

3. The presented design of the paddles (parts Nos. 202 & 240), the compression cylinders (218), and the Piston (220), as shown in the drawings, no matter how they will be modified, as a water-wave actuated compressor is limited to a certain size or amplitude of the waves because, if the amplitudes of the waves are relatively shorter than the length of the compression cylinder the piston does not reach the dead end of the compression cylinder resulting to a situation where the entrapped air will not be compressed far enough so it will refuse to enter the storage tank which is supposed to be in high pressure to contain plenty of energy reserved therein; and if the size or amplitude of the waves are relatively longer than the length of the compression cylinder the piston will hit the dead end of the cylinder and stops there too early. The remaining part of the long wave amplitude will be spent or destroyed needlessly pushing the already locked or dead paddles, pressing it against the limiting walls of the barge, and tends to destroy the bearings and the connectors or the whole system. These special features of the patented design of the actuator-compression system limits the conversion of energy to a small quantity or a small percentage of the aboundant energy offered by the ocean waves.

4. During calm weather when the ocean waves are small, the heavy barge which is designed to withstand the big surfs will just be flattening the waves resulting to a zero efficiency, no production because there will be no oscillation.

5. There is no plurality of storage tank to meet the opportunity to store more energy.

B. Referring to U.S. Pat. No. 1,887,316 dated Nov. 8, 1932 presented by J. A. LOCKFAW, the compressor System consisting of the Paddle, the Piston Rod, the Piston, the Compression Cylinder are constructed in the same manner as that presented by Smith. It can also work but with the following drawbacks and problems encountered:

1. This invention has the same problem encountered as problem No. 3 cited for Smith's which concerns the amplitude of the water-wave, which I hereby submit as objectionable feature and limitations of the design in its effectivity and efficiency of converting the available energy of the surfs. Plenty of wave energy will be wasted due to this problem.

2. There is much problem of inconvenience in adjusting the compressor or the system to synchronize with sizes of the incoming waves as the gearing-in or the gearing-out of the stand-by compression chambers has to be done manually which requires a full time operator.

3. This design requires a full time operatior to operate the car in adjusting the location of the power-board to synchronize with the elevation of the tides. This is also a problem of inconvenience.

4. A problem of durability is also an impediment to using this design because it will rust in salt water and easily destroyed by the waves during violent weather.

C. Referring to U.S. Pat. No. 1,061,091 dated May 6, 1913 by J. C. LEWIS, this design works good as a water pump provided there is no violent weather. But to make it work as an air compressor, the pump being simple, the problem of varrying amplitued or wave sizes will again present the impediment for commercial use of this invention.

D. Referring to U.S. Pat. No. 2,028,331 dated Jan. 21, 1936 by Hermann Janicke—a free piston three stage compressor, the following problems are present and impeds the commercial use of this design:
1. It requires fuel oil to make it work;
2. If it will be modified with a system so that the piston be actuated by the water waves, the problem on the varrying amplitued of the waves will again be unsolved. That means, as cited problem No. 3 on Smith's compressor, the pump is limited to a particular size or amplitued of waves in relation with the length of compression chamber, it being a simple pump even if constructed into a multi-stage compressor. If the piston moves halfway or ¾ of the length of the cylinder due to seasonal small waves available, the entrapped air partially compressed refuses to enter the storage tank and it will just kick the piston backward without storing energy because—(a) there are no valves in the pistons, (b) there are no valves at the rear end walls of the last compression cylinder, (c) the hollow piston, 2nd stage, is a hide out of partially compressed air that cannot be stored which will just kick the piston backward even if the piston has moved to the full length of the compression chamber. Thus, this pump presented by Janicke is a very poor performer when it is used to convert the energy of the water waves resulting to a very low ratio of production against cost.

In summary, all the aforementioned inventions presented by (A.) Smith, (B.) J. A. Lockfaw, (C.) J. C. Lewis, and (D.) Hermann Janicke have the following problems:
1. The problem on the effect of varying amplitude or sizes of the water-waves as explained in the forgoing paragraphs;
2. The problem of ineffectiveness during violent weather when it should be the opportunity to produce plenty of energy;
3. The very low ratio of energy production against cost of construction and maintenance, at the same time low efficiency.

SUMMARY OF THE SUBJECT INVENTION

The "Labrador Water-Wave-Energy Converter" is designed to solve all the aforementioned problems or impediments encountered preventing the commercial use of the aforementioned prior arts up to the present time. The subject energy converter is designed to work efficiently during ordinary weather and during violent weather as well, at the lowest cost of construction and maintenance, regardless of the sizes or varying amplitudes of the water waves, taking the opportunity to convert much energy during times of abundance.

There are Nine (9) inventions being applied for patent rights under this presentation, namely: (1) "Labrador Multi-Stage Piston Compressor"; (2) "Labrador Power Board System"; (3) "Type No. 1 Water-Waves-Energy Converter System"; (4) "Type No. 2 Water-Wave-Energy Converter System"; (5) "Type No. 3 Water-Waves-Energy Converter System"; (6) "Type No. 4 Water-Wave-Energy Converter System"; (7) "Type No. 5 Water-Waves-Energy Converter System"; (8) "Type No. 6 Water-Wave-Energy Converter System"; (9) "Water Wave Anti-Oscillation Resistor For Floating Bodies".

How these presented inventions solve the aforementioned problems:

(a) The Invention No. 1, being component No. 1 for Type No. 1 to 5, solves the following problems of the prior arts:
1. The bad effects of varying amplitude or sizes of the waves are solved by the ability of the chambers and pistons in series to trap and move the air forward even at a very small displacement made by the pistons. By connecting the piston rod at varying points along the vertical length of the said pendulum bar of the power board system according to the varying waves sizes to correspondingly limit the displacements of the piston to the length of the compression chambers, and also, to increase or decrease the mechanical advantage of the Power Board upon the compressor. In this way, the piston will just be playing within the free length of the compression chamber thereby removing or avoiding the danger of destroying the whole structure during violent weather taking the opportunity to convert plenty of energy during its maximum abundance.

The optimum length of the compression chamber naturally will be much longer than the wave lengths during ordinary weather, therefor, low pressure compression is expected—but this is solved by the presence of one-way valves at both rear and front ends of the chambers and the one-way valves in the pistons even if the pump is one-stage only. These valves make the entrapped air to be flowing forward along the axis of the compressor at any magnetude of forward displacement made by the piston no matter how short because the pistons create low pressures at every rear side for the higher pressure entrapped air at every front side to move forward into. When the pistons move backward, the entrapped air at the rear sides will be squeezed to transfer thru the valves of the pistons into the front side of the pistons ready for further compression. Thus, high pressure is developed even the during calm weathers when the waves are small. This means that this design solves the problem of low efficiency.

(b) Invention No. 2—the "LABRADOR POWR BOARD SYSTEM", being component No. 2 for Type No. 1 and Type No. 2 as illustrated in FIG. 3 to FIG. 5, solves the following problems of the prior arts:
1. Where the prior arts stop working during violent weather due to the over sized waves rushing to the shore, the Free Hanging Pendulum-Type Power-Board takes the opportunity to work hard during those times of abundance without the danger of being destroyed because it is a free swinging board and the extra length of the over sized waves will just spill thru under the Power-Board as it gains elevation when it swings far enough. Therefor, the excess force of the unexpected over sized waves will not press so hard against the Power-Board after the piston has been pushed to the end of the chamber. Another safety procedure is that the piston rod will be connected to the vertical pendulum bar at a point where the expected furthest swing of the Power-Board will just be enough to push the piston to the end of the compression chamber. A hinge joint is provided at the lower third of the pendulum beam just above the impact wall to let the pendulum beam bend backward and relax the impact wall by the manipulation of the hydraulic jack control system in order to allow the over size surfs spill thru under the impact wall when ever the pistons are about to hit the end walls of the compression chambers thereby achieving safety to the whole structure while it will be working hard during violent weather taking the opportunity to convert plenty of energy during its maximum abundance.
2. To achieve a high ratio of energy production during fair weather when the water waves are generally smaller, the piston rod will again be connected at a lower point on the pendulum beam to increase the displacement of the piston so that more air is compressed at every stroke of the small waves.
3. The problem on the effects of rising high tides or varying water levels is solved by the floater pipes attached to the bottom of the impact wall to carry the whole pendulum frame floating vertically above the water as the suspension box housing connector at the upper tip of the pendulum beam frees said beam to move up or down, and by Floating Pipe Foundation Assembly over deep waters.
4. The problem of heavy action of water waves against the walls of the floating barge is solved by my new design of a floating foundation which is in the form of 90% submerged pipe assembly laid horizontally on water on which the support posts of the power board is erected as shown in FIG. 5.
5. The problem of high cost of construction and maintenance in relation to energy output is solved by its simplicity of construction and by using low cost available timber materials and plastic materials.
6. The problem of too much energy of the water waves spent in splashing against the barge and in moving the barge up and down as presented by Smith is solved by eleminating the barge and by placing the Power Board System directly infront of the waves and directly bumping against the water waves or surfs.

BRIEF DESCRIPTION OF THE DRAWINGS

FIG. 10 is a longitudinal section of FIG. 9 thru line 2—2. FIG. 9 includes Invention No. 9.

DESCRIPTION OF THE PREFERRED EMBODIMENTS

Figure 1:
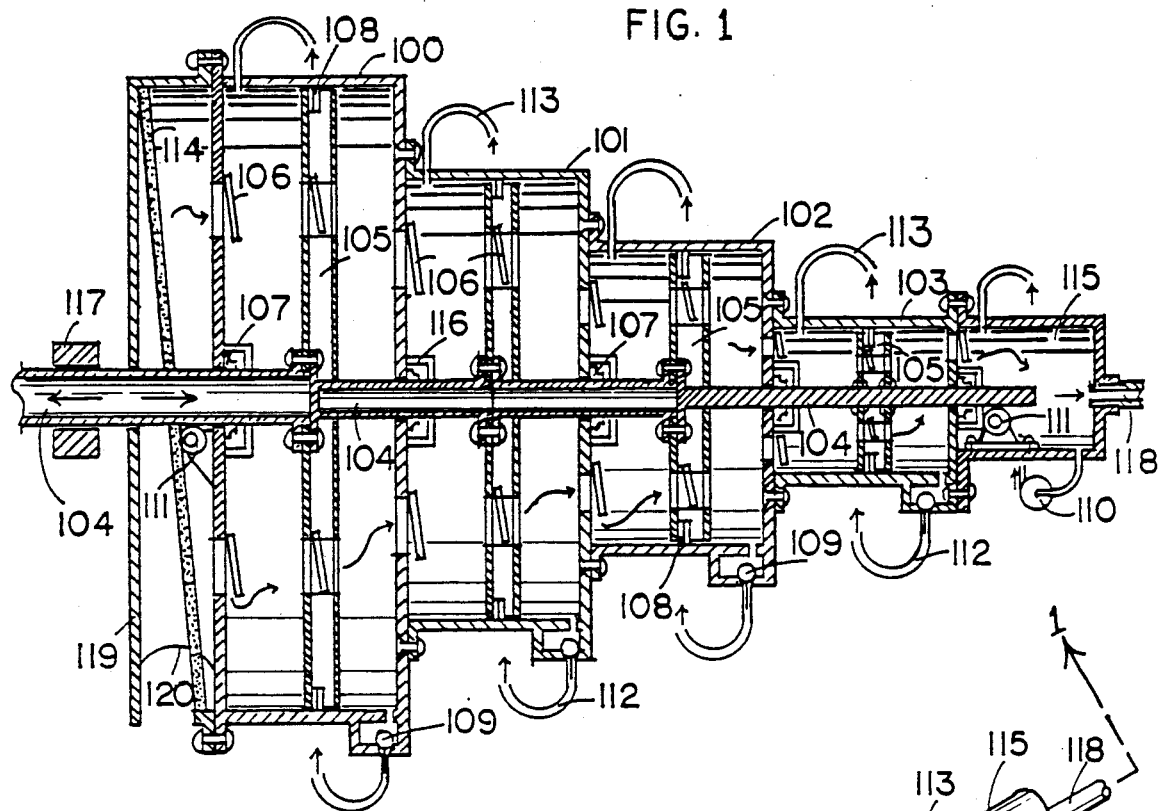
FIG. 1 is a longitudinal section taken along line 1—1 of FIG. 2.
Figure 2:
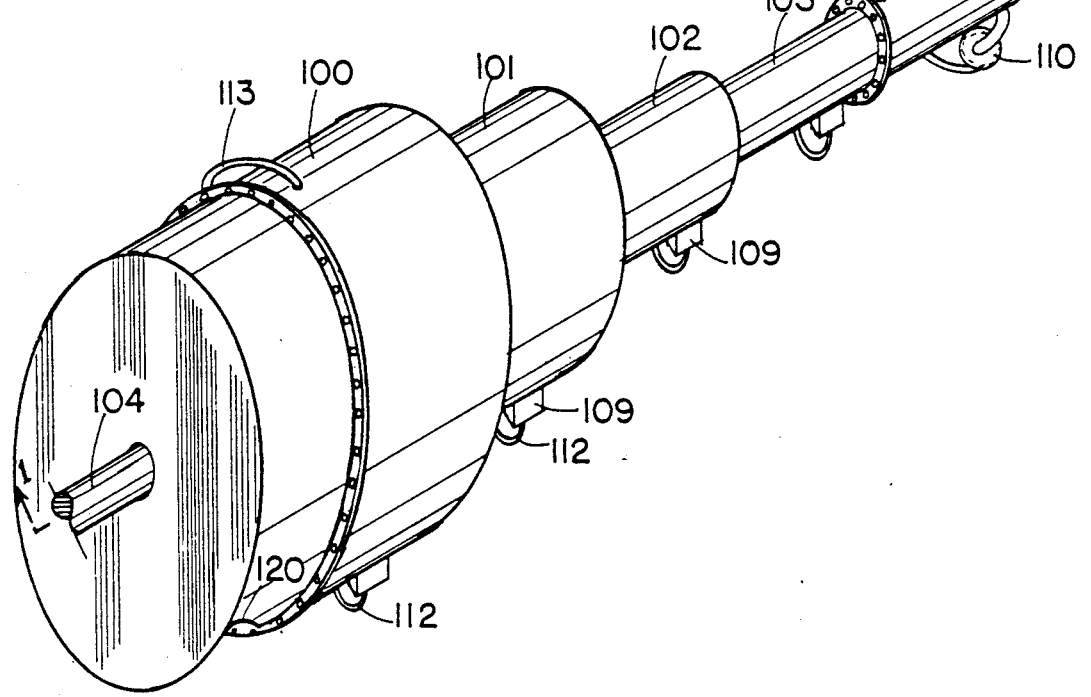
FIG. 2 is a schematic perspective view of a multistage compressor assembled to have four (4) compression stages showing a piston rod, an air vent, and bearing chamber.

FIG. 1 and FIG. 2 illustrate an embodiment of the invention No. 1 named as "LABRADOR MULTISTAGE PISTON COMPRESSOR" which can be operated by any machine that exerts a push and pull effort. As the piston 105 moves forward to the right all the valves 106 of each of the four (4) pistons closes and compresses the air on its front to the right at the same time creating a partial vacuum on its rear on the left causing the compressed air to transfer to the next smaller chamber to the right, that is, from chamber 100 to chamber 101, from chamber 101 to chamber 102, from chamber 102 to chamber 103, and from chamber 103 to chamber 115 all at the same time with atmospheric air entering chamber 100 from air vent 120 on the far left thru the air filter 114,—at the same time, as the valve 109 will be floating on oil, the difference in pressure between the front and rear of each piston will cause the oil to circulate to the top of each chamber to lubricate the piston rings, the valves and the sealers. On the backward movement of the piston all the valves 106 of the chamber walls will close causing the air on the rear side of the piston to transfer to the front side of each of the pistons all at the same time. Parts 107 is an air sealer, 108 is the piston ring, 104 is the piston rod, 110 is a motorized oil pump, 111 is a roller bearing that carry the wieght of the piston rod, 112 & 113 are oil circulation pipes, 117 is a control bearing to the piston rod, 116 is a piston stopper to protect air sealer 107, 115 is a chamber that houses bearing 111, and 118 is a delivery pipe for the high pressure air. This compressor serves as component No. 1 of the Water-Wave-Energy Converter.

Figure 3:
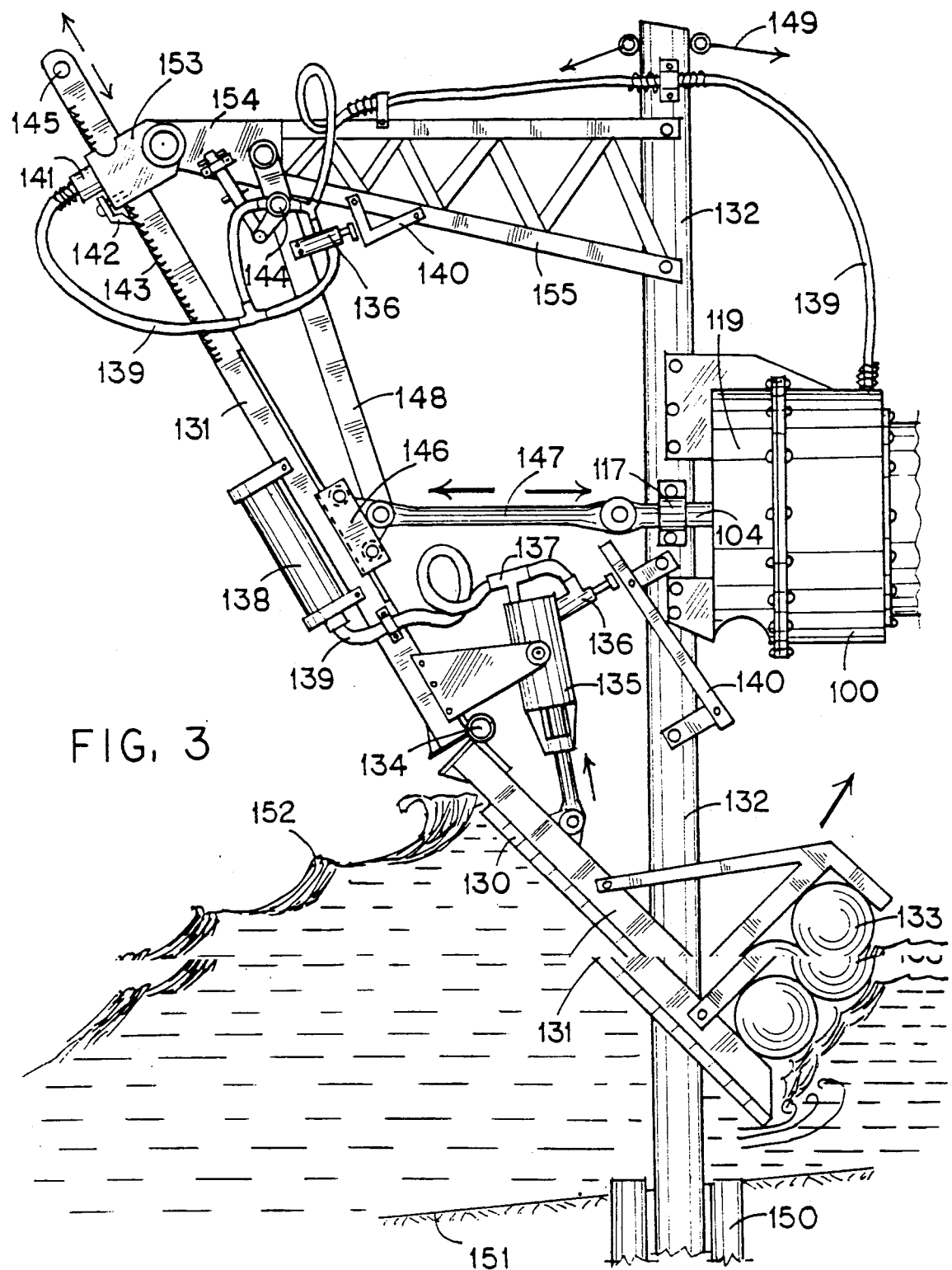
FIG. 3 is a side elevation view of the Power Board System indicating the various structural parts in the most logical arrangement including its control system (without showing the other nearer post) constructed on shallow waters.

FIG. 3 illustrate an embodiment of the invention No. 2 named as "LABRADOR POWER BOARD SYSTEM" which receives the direct impact of the water waves thru the wide faced impact wall 130 held by the pendulum frame 131 which transmits the energy of the waves to the compressor 100 thru a push rod 147. The main support posts 132 with its horizontal arm 154 to 155 comprises a minimum of two to form a vertical rectangular frame to suspend vertically the pendulum beam 131 thru a box connector 153. The pendulum frame consisting of two pendulum beams 131 coupled together by impact wall 130 is provided with at least two float pipes 133 attached to the bottom and along the horizontal length of the impact wall 130 in order to carry the whole pendulum frame and keep it adjusted to the changing elevation of the tides at all times. Each of the pendulum beam 131 is provided with a joint 134 which enables it to bend backward by means of the hydraulic control systme 135 to 139 every time an over size surf strikes the power board specially during violent weather in order to keep it working and take advantage of the abundance of energy on those times without endangering destruction of the machine. The push valve 136 will release the hydraulic fluid when it bumps with bumper 140. The pressurized tank 138 will force back the oil to the hydraulic jack 135 during the return cycle of the pendulum frame and the return cycle of the water wave will also help straighten up the pendulum beam 131. The box connector 153 will allow the pendulum beam 131 to move up and down as it adjust to the elevation of the tides but it is provided with a pneumatic clamp 141 to hold the beam 131 every time the joint 134 relaxes as the push valve 136 will bump 140 to allow the compressed air from chamber 100 to get into the clamp 141. Rotary switch 144 will relax clamp 141 when the pendulum frame 131 comes to vertical position. The gear tooth 142 will hold the beam 131 thru straight gear 143 every time the surf (big or small) strikes the impact wall to prevent the impact wall from rising upward due to the swell of the water waves which affect floater 133. Traveling bearing 146 keeps sliding along the length of beam 131 as it is fixed in elevation by redundant bar 148. Guy wire 149 reacts against the action of the surfs and keeps the posts 132 in erect position.

Figure 4:
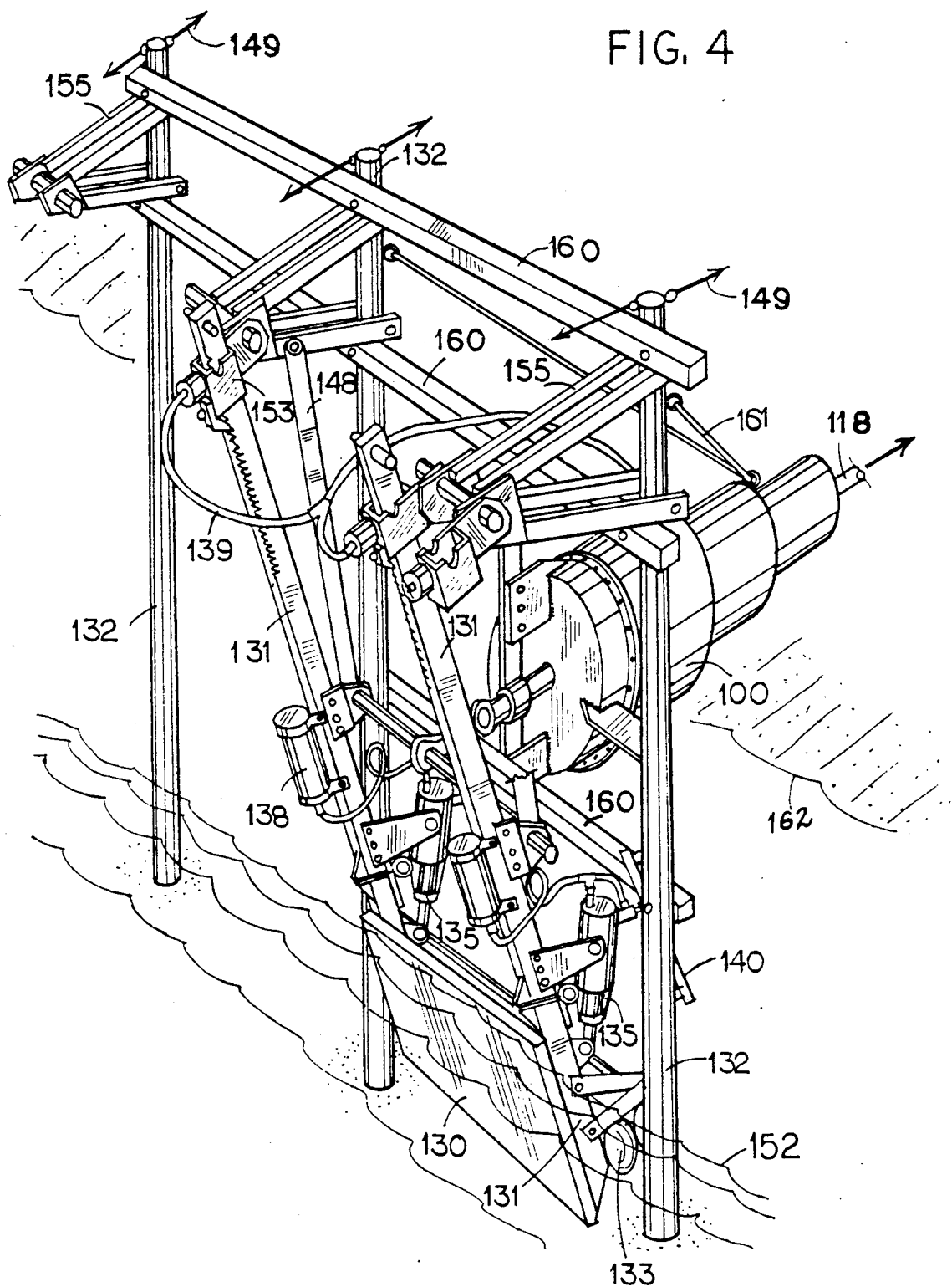
FIG. 4 is a schematic perspective view of the Type No. 1 Water-Wave-Energy Converter System showing joint structure for a series of adjacent converters constructed on the seashore or on shallow waters, indicating only one multistage compressor for each Power Board.

FIG. 4 illustrates an embodiment of the invention No. 3 which is a combination of invention No. 1 and the invention No. 2 coupled together to act as one machine and is hereby named "TYPE NO. 1 WATER-WAVE-ENERGY CONVERTER SYSTEM" which is adaptable on shallow waters or on the seashore where the sea bed is available as foundation for the support posts. This machine, in combination with gas-turbine electric generator and electrolizer, will produce consumable energy in the form of compressed air, electricity, and hydrogen gas fuel in capsules. The Power Board System produces mechanical energy out of the kinetic energy of the water waves, the Multi-stage Compressor produces compressed air out of the mechanical energy of the Power Board System, the Air-Turbine Electric Generator produces electric energy out of the compressed air, and the electrolizer produces hydrogen gas fuel, oxygen, & salts out of the sea water by means of electric energy. This FIG. 4 further illustrates how a series of adjacent power boards are constructed in a long line with only one compressor for every power board. The parts shown in this figure have the same reference numerals as in FIGS. 1, 2, & 3 to avoid misidintification. The coupling brace 160 holds together the support posts in a series in equal spacing at the same time holds in place the compressor 100 with the help of the tension bars 161. Line 162 is the water edge on the seashore. Line 152 is the nose of the water wave striking the impact wall.

Figure 5:
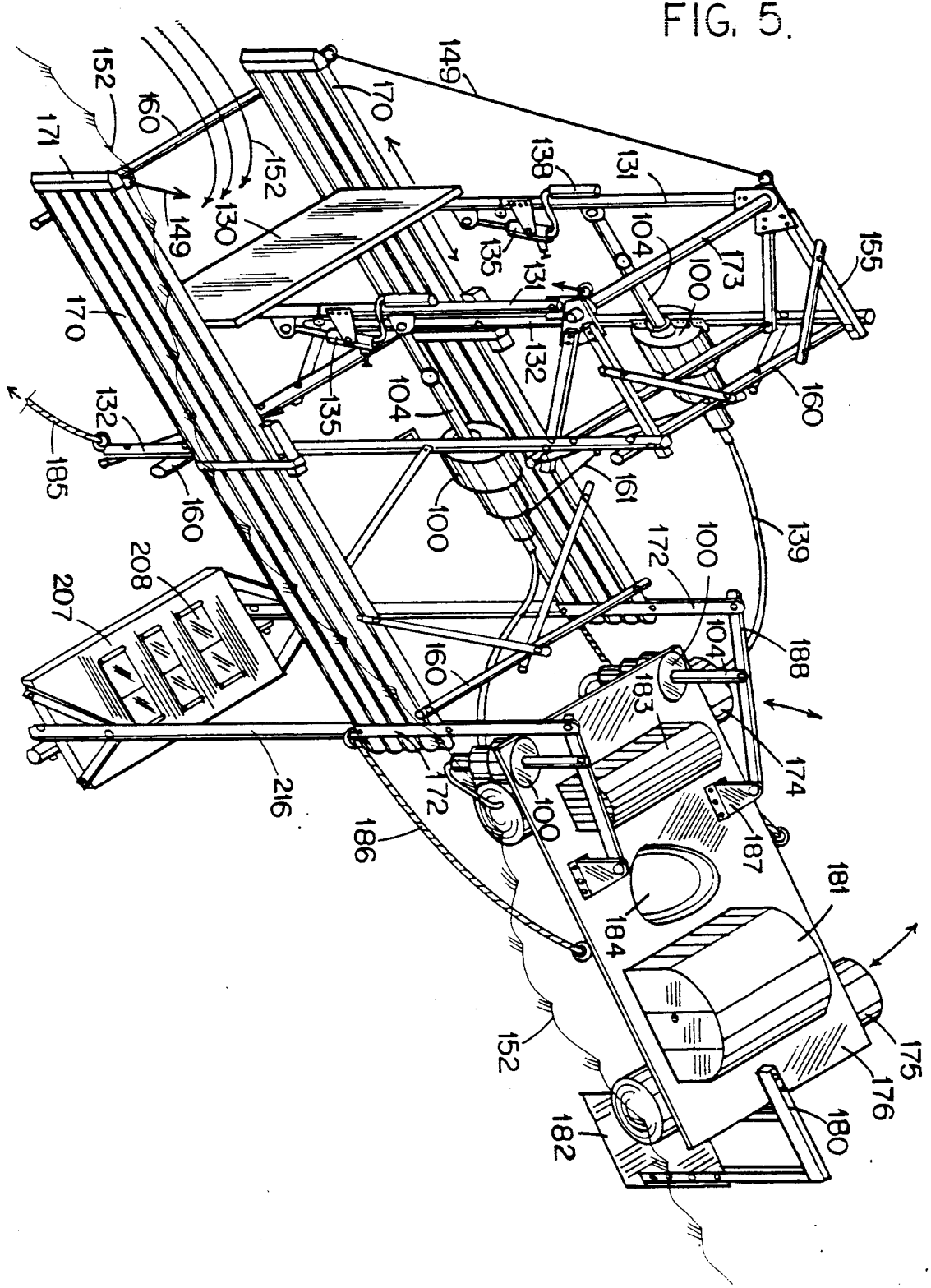
FIG. 5 is a schematic perspective view of the Type No. 2 Water-Wave-Energy Converter System showing a new invention of a special floating foundation that cannot be oscillated by the water waves on which the support posts of the Power Board System is erected to make it stand above the water surface. Also shown is a new invention in which the said floating pipe foundation is provided with an Anti-Oscillation Resistor in the form of a wide flat board positioned horizontally held way down 30 feet below the water surface by strong pipes. Also shown is a new invention in which the floating air storage tanks carry compressors that are operatively connected by drive bars to the rear tip of the said floating pipe foundation that is steady while the floating tank will be the one oscillating or moving the compressor up and down to produce compressed air—at the same time the air tanks carry a flat deck to house the electric generator, the electrolizer, and a warehouse.

FIG. 5 illustrates an embodiment of the invention No. 4 comprising of a 90% submerged horizontal pipe assembly 170, long enough to span at least two crest of large size water waves, attached to and serves as footing for each of the support posts 132 of the power board system to make the whole converter system to be floating over the deep ocean without being oscillated by the water waves 152. Each of the footing pipes 170 are attached to the support posts in such a formation that the 2nd pipe is on top of the first, the 3rd on top of the 2nd, the 4th on top of the 3rd, and so on, in order to form a thin bladed beam that easily slice thru the onrushing surfs and thru the up and down motion of the waves. The front end of the pipe footing assembly 170 is provided with a straight vertical clip 171 which has a blade pointed against the waves, and at the rear end of the pipes is another clip 172 to keep the pipes in good formation acting as one strong beam. Anchor chain 185 is a "Y" type holding each of the bottom tip of the support posts and the lower one end is anchored to the sea bed on which the whole structure will be pivoting according to the direction of the waves. Since this is a single installation of a power board system, it is preferable to attached one multi-stage compressor 100 to each of the support posts to minimize unnecessary structural bracings. Guy wire 149 keeps the power board system stay erect against the heavy backward push by the water waves. The gas storage tanks 174 and 175 are tailing the floating pipe footing assembly 170 by means of tie rope 186 and by the pump drive bar 188. The two storage tanks are spaced far apart by the flat deck 176 to form a barg which carries the Gas-Turbine Electric Generator 183, the electrolizer 184, the cabin 181, and the two small compressors 100 to compress hydrogen and air. Storage tank 175 stores the hydrogen gas produced by electrolyzer 184. Tank 174 stores compressed air from compressor 100 delivered by air hose 139. Drive bar 188 is necessary to keep away the barg 176 and to prevent it from rubbing against the rear end of the pipe footing assembly at the same time it pushes up and down the piston rod 104 to operate the small compressor 100 as the tank 174 floats up and down by the swell of the water waves pushing up and down the small compressor 100 against drive bar 188 while the pipe footing assembly 170 remains steady not being affected by the waves. Several apparatus of this kind may be built all over the ocean around the world for the nations that need home made energy. Several apparatus of this kind may contribute compressed air to a central power plant in-land for the needs of industries. This invention No. 4 is hereby named "TYPE NO. 2 WATER-WAVE-ENERGY CONVERTER SYSTEM". This machine works with the water waves in the same manner as Invention No. 3.

An Anti-Oscillation Resistor 207 that has up ward one-way valves 208 is a large wide board positioned horizontally at about 30 feet below water surface, attached to the rear tip of the floating pipe foundation by means of a rigid strong pipe 216 to prevent the floating pipe foundation 170 from oscillating due to the action of the waves and to produce more force upon the horizontal drive bar 188 to operate the vertical piston rods into the smaller compressor 100.

Figure 6:
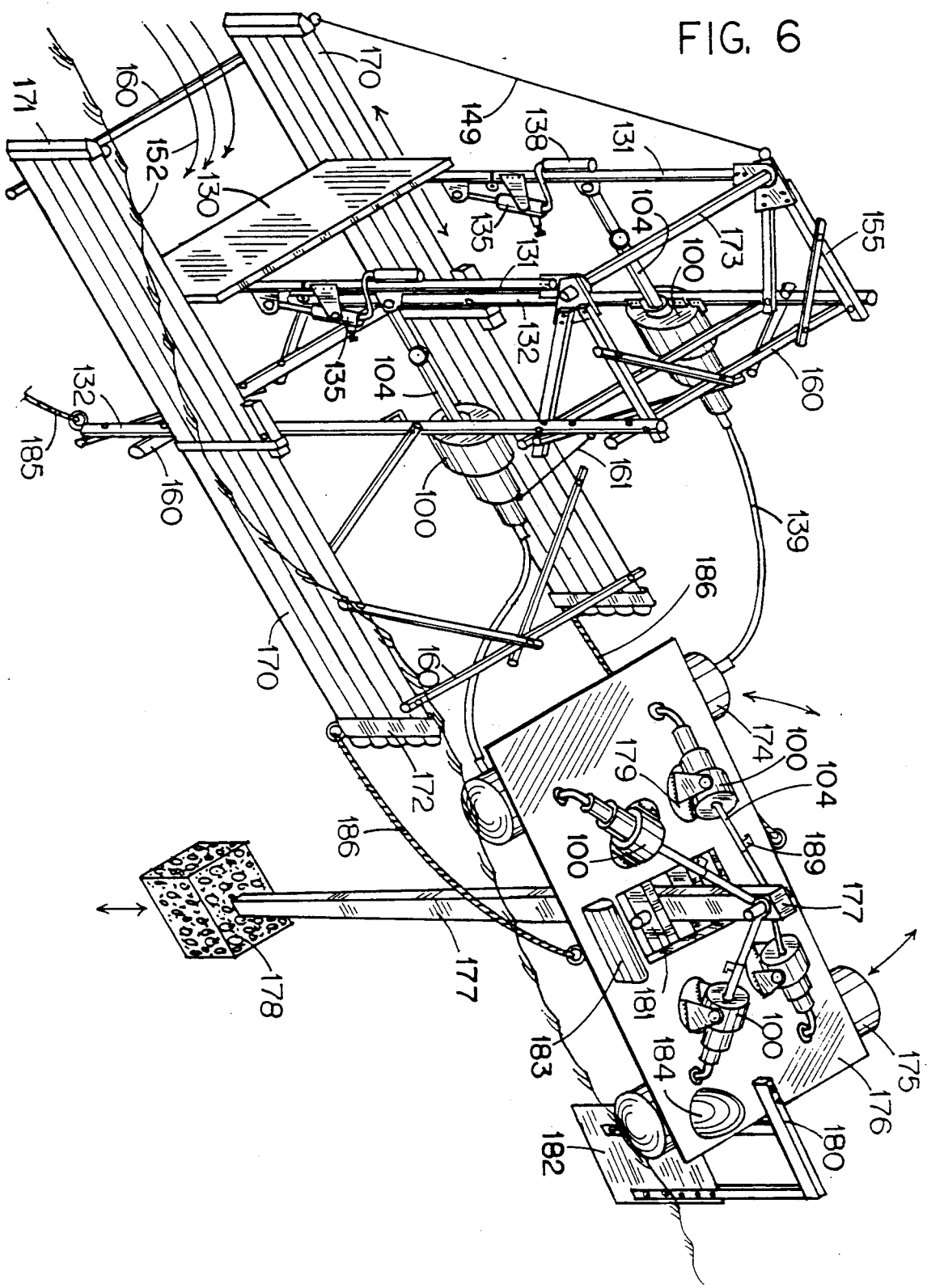
FIG. 6 is a schematic perspective view of Invention No. 5—Type No. 3 Water-Wave-Energy Converter System showing a new invention in which the floating air tanks, by means of a flat form on top, carry the compressors that are systematically positioned and anchored to be freely turning left and right or up and down according to their positions in relation with the vertically fixed drive bar that is firmly keepped vertical by a heavy dead weight at its bottom tip at about 30 feet below water surface where there is no water oscillation movements. As the air tanks are ascillated by the water waves, the compressors are pressed against the fixed piston rods which are held by the vertically firm steady bar. Basically, it is the floating tank that drives the compressors.

FIG. 6 illustrates an embodiment of the invention No. 5 which is hereby named "TYPE NO. 3 WATER-WAVE-ENERGY CONVERTER SYSTEM" comprising the same principal structures as in FIG. 5 except that the FOUR (4) Multi-Stage Compressors 100 installed on the Flat Deck 176 are set on free revolving footings 179 so that the said compressors are free to move vertically and horizontally according to the movements of the floating storage tanks 174 and 175 as affected by the water waves 152 from all directions in relation to the Vertically Fixed Strong Rigid Bar 177 to which the compressors 100 are pressed against via the piston rods 104. The Rigid Bar 177 is forcibly keepped vertical and steady by the bottom weight 178 which is rigidly attached to the bottom tip of Bar 177 at about 30 feet below water surface where the water has no movements. The Flat Deck 176 pivotes at the pin connector 181 in relation to Fix Bar 177. To keep the Flat Deck always positioned perpendicular to the water waves, the caudal board 182 is attached at the rear of the deck.

Figure 7:
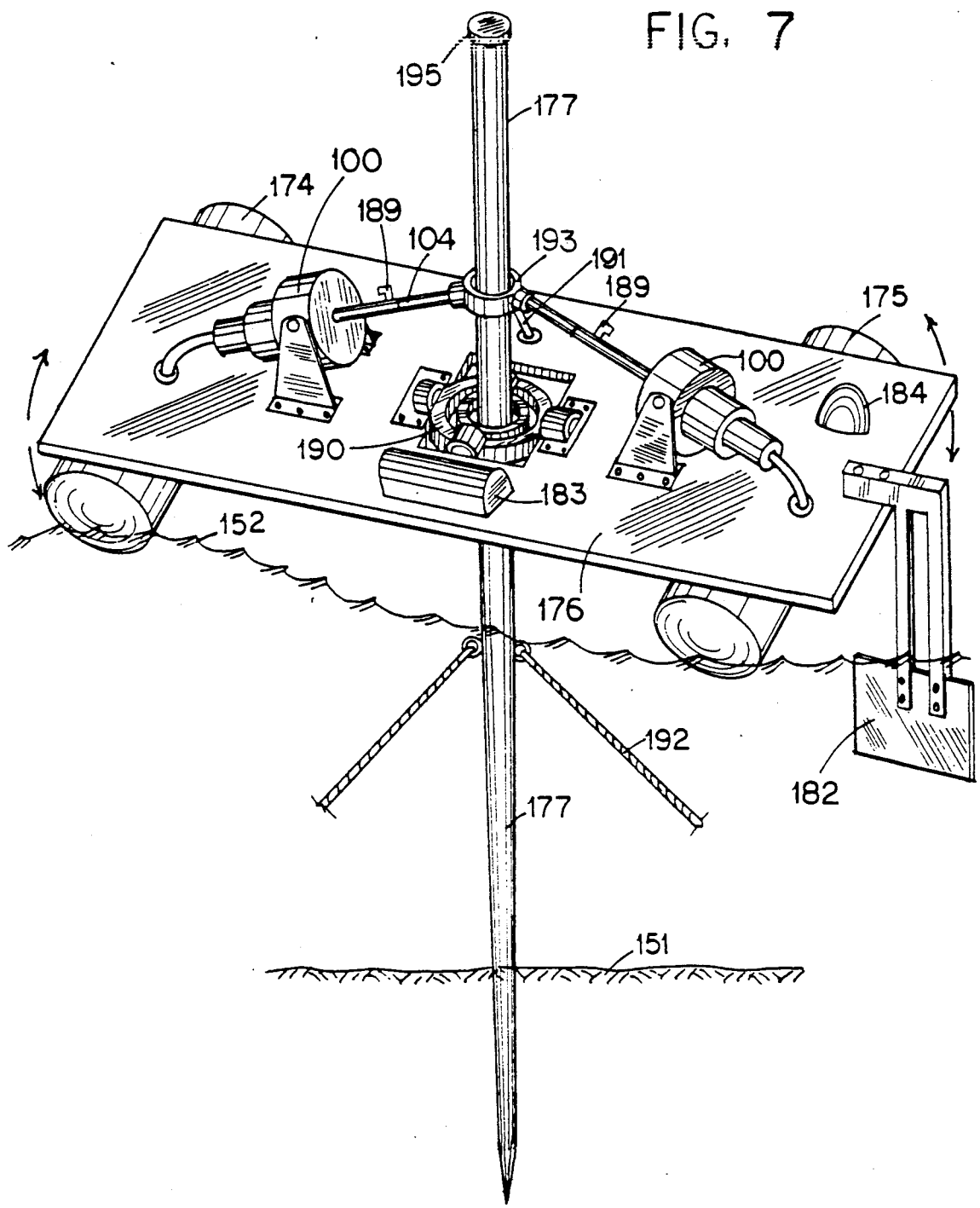
FIG. 7 is a schematic perspective view of Invention No. 6—Type No. 4 Water-Wave-Energy Converter System showing a new invention which is similar to Invention No. 5 but differs in that the fixed vertical bar is held in place by a foundation driven into the ocean floor and it is keepped erect by guy ropes anchored to the ocean floor. The flat-form carrying the compressors is free to move vertically up and down according to the changing elevation of the tides because it is loosely connected to the fixed vertical bar thru the ring connectors.

FIG. 7 illustrates an embodiment of the invention No. 6 which is hereby named "TYPE NO. 4 WATER-WAVE-ENERGY CONVERTER SYSTEM" which has the same principal structures as in invention No. 5 except that the Vertically Fixed Strong Rigid Bar 177 is driven direct to the ocean bed or attached to a special footing on the sea bed and said Bar 177 is keepped rigidly vertical by guy ropes 192 anchored to the sea bed. The Flat Deck 176 which holds the compressors 100 pivotes about the Rigid Bar 177 by means of a loose ring connector 190 which is in the form of a universal joint. Connector ring 193 is also loose in relation to Bar 177 in order to allow the whole Flat Deck 176 to move up or down the length of Bar 177 to adjust with varying elevation of the tides. Strut 191 fixes the elevation of ring connector 193 in relation with deck 176. Piston Rod 104 is provided with a hydraulic switch adjuster 189 as an automatic Piston Relaxer every time the over sized water waves move up the air tank 174 & 175 to avoid destruction of the compressor. Caudal Board 182 keeps the Flat Deck in correct position in relation with the waves. As per invention No. 5, this invention No. 6 is also provided with an air driven electric generator and an electrolizer anchored on the Flat Deck to produce hydrogen fuel out of sea water.

Figure 8:
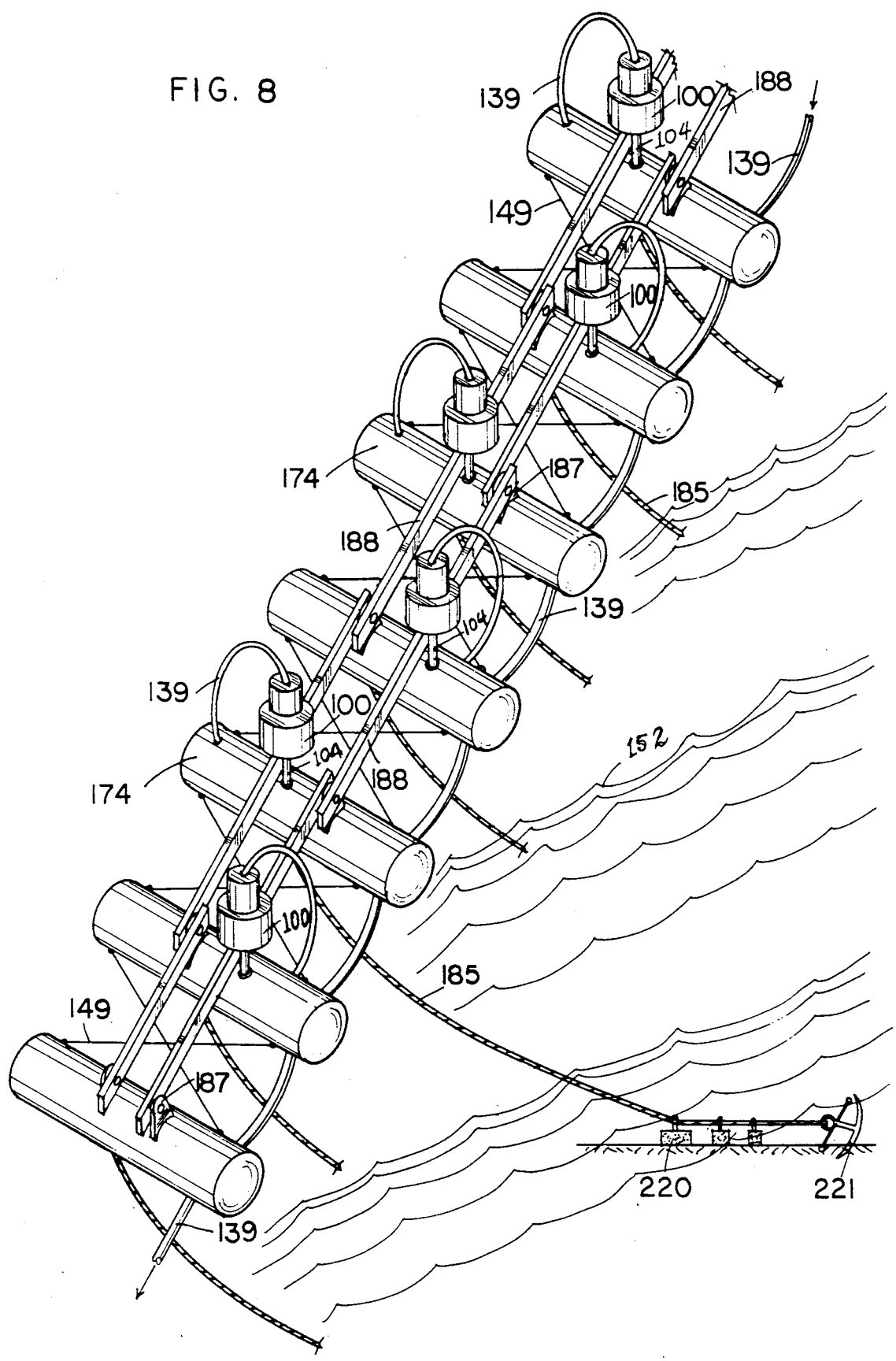
FIG. 8 is a schematic perspective view of Invention No. 7—Type No. 5 Water-Wave-Energy Converter System showing a new invention in which a series of floating storage air tanks (elongated) are operatively connected to each other by rigid bar connectors each of which carry one compressor, perpendicular to and space the tanks on a long line of structures that is 30 to 45 degrees oblique angle to the water waves. The tanks to which the piston rods are fixed move up and down by the action of the waves press the piston rod directly against the compressors that move down in opposite direction against the up going tank.

FIG. 8 illustrates an embodiment of invention No. 7 which is hereby named "TYPE NO. 5 WATER-WAVE-ENERGY CONVERTER SYSTEM" which produces compressed air out of the water wave energy due to the alternate up & down movements of one after the other of a series of floating air tanks arranged in a long straight line fixed obliquely to the direction of the waves or even set loose along the direction of the waves. It is composed of Pipe Air Tanks 174 alternately connected to each other by strong drive bar 188 which firmly hold the compressor 100 in a vertical position on top of every tank. Each piston rod 104 penetrates the corresponding tank that holds it by a connector at the bottom of each tank to make the tank fixed in one position. Each Drive Bar 188 carry one Multi-Stage compressor 100 which is held firm against the piston 104 being pushed up & pulled down by each tank 174. As the water waves move up one tank 174 the corresponding piston rod 104 moves up into the compressor 100, at the same time the succeeding next tank moves down on the valley of the waves moving down the compressor 100 against the rising piston effecting the compression process on the first pump at the same time effecting the suction process on the second compressor, and so on. The weight 220 hanging on the anchor rope 185 is the shock absorber against jerk on the rope 185 due to the action of the waves on the tanks. Cross-Brace Ropes 149 are provided to brace the tanks to make them stay squarely in relation with the drive bars. The compressed air stored in each of the tanks 174 is delivered to the power station or to the factory thru the air hose 139 which is connected to all the floating air tanks 174.

Figure 9:
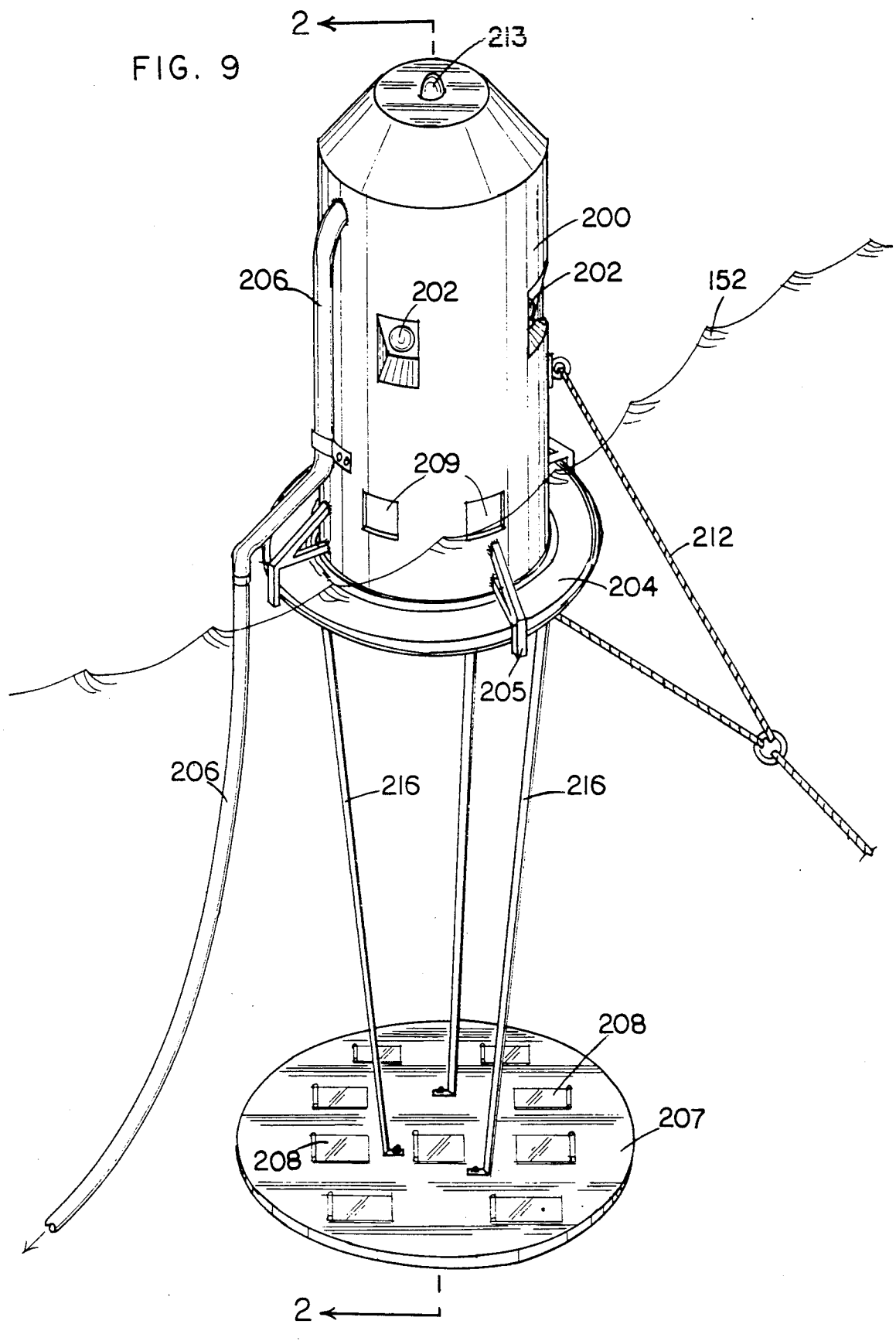
FIG. 9 is a schematic perspective view of a floating Water-Piston compressor—Invention No. 8—Type No. 6 Water-Wave-Energy Converter System.

FIG. 9 illustrates an embodiment of invention No. 8 which is hereby named "TYPE NO. 6 WATER-WAVE-ENERGY CONVERTER SYSTEM" which produces compressed air thru the up and down movements of the water surface into the interior of a large vertically floating pipe 200 due to the action of the water waves. This is a water-piston compressor. The whole system is keepped afloat by the ring floater 204. It is keepped rigidly vertical against the horizontal forces of the waves by the Sling Rope 212 and by the Oscillation Resistor 207 which is held rigidly down by redondant beams 216 at least 30 feet below the water surface. The Oscillation Resistor 207 prevents the whole system from going up every time the water waves 152 come in, at the same time Sling 212 acts the same way, thereby pressing the main body 200 against the rising water surface 217 as shown in FIG. 10 thereby effecting the compression process.

FIG. 10 is a longitudinal section of FIG. 9 thru line 2—2 illustrating the internal mechanism of the whole system. When the water surface 217 rise up into the system, the entraped air is compressed upward lifting the Float Valve Balls 201 and the one-way valve 210 to let the air into the lower chamber and into the upper chamber if the water wave is big enough to make the water surface rise above the lower valves. When the water rises above any of the valves, the Ball Valves 201 & 202 will just float releasing the water down but closes to trap the air when the water is gone. The valves 202 and 209 contribute to the rapid entrance of water into the chambers thru the side walls of the main body 200 to take advantage of the large available energy of the waves during violent weather. The lower float valve 201 keeps the compression process going on even during calm weather when the waves are small because the head-room of the rising water piston is made low which make it easier to push the compressed air past the lower main valve 201. The air turbine 203 supplies electricity to the warning light 213. Cage 214 limits the play of float valves 201 and 202. Pipe 206 delivers compressed air to the power station. Weight 215 keeps the whole system to an erect position specially during violent weather. Structural brace 205 holds the ring floater 204 in place. The one-way valves 208 of the oscillation resistor 207 facilitate the downward movement of the system in accordance to the lowest valley of the waves to maximize the amplitude of the water piston. Side valves 202 and 209 bring in new air into the chambers when the water surface 217 recedes down.

HOW THESE INVENTIONS WORK

1. Invention No. 1, the "Labrador Multi-stage Piston Compressor"—the discussion on how this compressor works can be read as previously discussed in the first paragraph of the description of the preferred embodiments.

2. Invention No. 2, the "Labrador Power Board System"—referring to FIG. 3 of the herewith accompanying drawings, as the water wave 152 bumps or splashes upon the face of the impact wall 130, said impact wall 130 is pushed backward by the horizontal force of the said water waves. The vertical pendulum frame 131, being the one holding and carrying the impact wall 130, and being held and suspended by the free-pin box connector 153 at its top, is forced to swing backward too due to the force transmitted upon it by the impact wall 130 from the water wave 152. As the pendulum frame 131 swings backward, the push-rod 147 is pushed backward due to the force transmitted to it by the traveling bearing 146. As the push-rod 147 is activated by the pendulum beam 131, it also activates the piston rod of the compressor 100 thereby effecting the compression process. For safety of the machine and to make it continue working during violent weather, the pendulum beam 131 is able to bend backward to yield for the over-sized waves to pass under. As the oversized water wave strikes the impact wall 130, the pendulum beam 131 swings very far back until the push valve 136 hits the control bumper 140, at a time the piston of the compressor is approaching the end walls of the compression chamber, thereby making the control jack 135 give way to the great force of the pendulum beam acting on it by releasing its hydraulic fluids that transfers to the pressurized tank 138, allowing the pendulum beam 131 to bend backward thru the free-pin connector 134, and consequently, allowing the excess energy of the big surf to just spill thru under the impact wall 130 which assumes a horizontal position. At the same time, the upper push valve 136 also hits the upper control bumper 140 allowing compressed air to get into the pneumatic control clamp 141 which holds firmly the upper end of the pendulum beam 131 preventing it to drop down while its lower portion is on the process of returning to its original straight position as the water recedes back to the sea, and the hydraulic fluid also returns back to the hydraulic control jack due to the pressure at the oil tank 138 and by the suction force of the control jack piston as the impact wall is push forward by the receding water or the return cycle of the water wave. As the pendulum beam 131 assumes a vertical position, the rotary valve 144 releases the compressed air at the clamp 141 thereby dropping down the whole pendulum assembly and making the floater 133 assume its duty to carry the whole pendulum assembly and position the impact wall 130 to a correct elevation in accordance with the prevailing elevation of the tide water at that time. As the water wave pushes the impact wall backward, the whole pendulum assembly swings backward, effecting the compression process immediately and the push-rod 147 reacts back pressing the upper end of the pendulum beam 131 against the gear tooth 142 that bites against the straight gear 143 preventing the impact wall to rise up which tends to scape the force of the water wave as it affects the floater 133 that moves up the whole pendulum assembly.

3. Invention No. 3, the "Type No. 1 Water-Wave-Energy Converter System"—referring to FIG. 4 of the herewith accompanying drawings, it can be observed that this machine is an assembly of Invention No. 1 together with Invention No. 2 acting as one complete energy machine erected on shallow waters where the ocean bed is available for foundation or erected on the seashore forming a long series of power boards adjacent to one after the other using one support post as common post for every adjacent power board. The compressor 100, which is Invention No. 1, named "Labrador Multi-stage Piston Compressor", works in the way it has been explained in the first paragraph of the description of the preferred embodiments this specification. The Invention No. 2, named "Labrador Power Board System", comprising parts No. 130, 131, 132, 133 to 150, 153, 154, 155, 160, & 161 (from FIG. 3 and FIG. 4), works in the way it has been explained in the preceding paragraph. As the water waves activates the Power Board System thru impact wall 130, said Power Board System also activates the compressor 100 thru the push-rod 147 which pushes and pulls the piston rod of said compressor thereby consumable energy is produced in the form of compressed air. As indicated, this machine is in combination with a Gas-Turbine-driven Electric Generator together with an electrolizer to produce Hydrogen Gas fuel but not indicated in the drawings because said generator and electrolizer are already old existing elementary parts of a power plant and a factory plant known to man. Thru the discharge pipe 118 of the compressor 100, compressed air is supplied to the Gas-Turbine which in turn drives the electric generator that supplies electric energy to the electrolizer which produces the hydrogen gas fuel for cars and other industries.

4. Invention No. 4, the "Type No. 2 Water-Wave-Energy Converter System"—referring to FIG. 5 of the herewith accompanying drawings, it can be observed that it is basically an assembly of Invention No. 3 that is constructed totally floating on waters by using a 90% submerged horizontal pipe assembly to serve as footing for the support posts of power board system, all together with the necessary air/gas storage tanks 174 & 175 that carry the flat deck 176, and the oscillation resistor 207. The whole system being always on the water surface, it is no longer necessary for the impact wall 130 to adjust with the varying elevation of the tide water—so floater 133 and pneumatic clamp 141 and the gear tooth 142 are all eliminated on this Type No. 2. The compressor 100 works the way it has been previously explained in the first paragraph of the description of the preferred embodiments, and the power board system (impact wall 130 & its supporting components) works the way it has been previously explained in the next to the preceding paragraph. As compressed air is produced at compressor 100, the compressed air travels thru air hose 139 and gets deposited at the air tank 174 from which steady pressure air is supplied to the air driven electric generator 183 which in turn supplies electricity to the electrolizer 184 that produces hydrogen gas fuel. Since the floating air tanks are also being move up & down by the water waves that has been reduced in size by the impact wall 130 but rejoined by the other waves that did not hit the impact wall, it is also wise to take advantage of that available free energy by using it to activate the vertical compressors 100 that are attached to the front end corners of the flat deck 176. As the water wave 152 lift up air tank 174, the oscillation resistor 207, due to its valves 208 closed with its wide face against the water and being 30 feet below water surface where the water stand still, is hard to move up so suddenly, so it prevents the drive bar 188 from rising up thru redundant bars 216 & 172, therefor, the flat deck being the one moving up presses the vertical compressors 100 against the steady piston rod 104 being held firmly by drive bar 188. In addition to the anti-oscillation resistance being exerted by 207, the floating pipe footing assembly 107, due to its length equal to two large water waves, also exerts great resistance against oscillation to the drive bar 188. This same procedure may also be done with the rear air tank 175 by attaching such components to the rear end corners of the flat deck 176. At the valley of the water waves, the resistor 207 moves down easily because its one-way valves 208 open automatically. As the water wave pushes the impact wall 130 backward, the anchor chain 185 holds back the bottom end of the support posts 132 which holds in place the compressor 100 against the moving piston rod 104 being activated by the swinging pendulum beam 131. Upon the return cycle of the water wave, the drive bar 188 and the tie rope 186 holds back the floating pipe footing assembly from moving forward, therefor, only the impact wall 130 moves forward thereby pulling out the piston rod from the compressor—because at that moment, the floating air tank 174 is the one being pushed backward by the water wave that have just passed the impact wall 130.

5. Invention No. 5, the "Type No. 3 Water-Wave-Energy Converter System"—referring to FIG. 6 of the herewith accompanying drawings, it can be observed that it has the same principal structures and works in the same way as the herewith Invention No. 4 as has been explained in the preceding paragraph hereof, but the only big difference, is that there are four (4) compressors 100 (Invention No. 1) installed on the flat deck 176 that are activated by only one drive bar 177 which remains firmly vertical due to the weight 178 attached to its bottom tip at about at least 30 feet below the water surface. This air tank-flat-deck assembly can be an independent energy converter system separate from the Power Board System. As the water wave lift up the front tank 174 and rear tank 175 moves down the valley being left behind by the preceding water wave, the flat deck 176 assumes a slant position with its front end up but the strong vertical drive bar 177, being free-pin connected to the center of the flat deck 176, remains rigidly vertical due to the heavy weight 178 attached to its bottom tip, thereby, the two compressors 100 at the front area of the deck 176 are pressed against their corresponding steady piston rods 104 effecting the compression process, at the same time, the two compressors 100 at the rear area of the said deck 176 are move away from their corresponding piston rods 104 pulling the piston outward effecting transfer of air from rear to the front side of each of the pistons. As the water wave moves on to the rear, leaving behind the front air tank which drops down the valley, the rear air tank 175 is lifted up making the flat deck 176 assume a slant position with its rear end up but the drive bar 177 still remains in vertical position, thereby, the two compressors 100 at the rear area of the flat deck 176 are pressed against their corresponding steady piston rods being held firmly by the drive bar 177 effecting the compression process on said rear compressors while the pistons of the front compressors are pulled out. The production of electricity by this machine is done in the same procedure as in Invention No. 4. To make it safe and continue operating during violent weather, the piston rod 104 is made hydraulically telescopic with a push-type switch to relax it as said switch bumps against the wall of the compressor 100 every time an oversized water wave hits the system thereby releasing the oil or compressed air contained in said piston rod 104. When the piston rod 104 is pulled out from the compressor the oil/compressed air is sucked back into the piston rod 104 to assume its original length. Several of this "Type No. 3 Water-Wave-Energy Converter System" may be constructed floating out on the ocean to harvest more of the unlimited free energy being offered by the ocean waves.

6. Invention No. 6, the "Type No. 4 Water-Wave-Energy Converter System"—referring to FIG. 7 of the herewith accompanying drawings, it can be observed that its principal structures (floating air tank, flat deck, vertical drive bar assembly) is the same as that of the preceding Invention No. 5 and that this machine works exactly in the same way as said Invention No. 5 which can be read as has been explained in the preceding paragraph hereof, except that in this construction the vertical drive bar 177 is directly and vertically driven into the ocean floor to stand vertically rigid against all forces of nature or it can be anchored to the ocean floor by special footing where the water is shallow and the ocean floor is available for foundation. In the same manner, for safety purposes, the piston rods 104 are made self adjusting telescopic hydraulic pipes to take care of the oversized waves during violent weather, and in addition to this provision, the flat deck 176 may be eleminated so that all the principal components will just be resting or attached to the structural beams that interconnect the floating air tank 174 & 175 in order to eleminate wide faced materials that will bump against the oversized water waves. The size of the air tanks 174 & 175 will be made proportional enough to the strength of the structural members so that the said air tank 174 & 175 will just sink into the oversized water waves every time said waves tries to overturn the whole system.

7. Invention No. 7, the "Type No. 5 Water-Wave-Energy Converter System"—referring to FIG. 8 of the herewith accompanying drawings, it can be observed that the system is an unlimited endless series of preferably eliptical cylinder air tanks 174 arranged in a long straight line oblique to the water waves having independent vertical movements from each other, horizontally floating on the ocean, parallel to each other and perpendicular to the drive bars 188 which interconnect said tanks one after the other. This machine works with the ocean waves as it has been previously explained in the detailed description of FIG. 8.

8. Invention No. 8, the "Type No. 6 Water-Wave-Energy Converter System"—referring to FIG. 9 and FIG. 10. The mechanism of this machine works in the way it has been previously explained and can be read from the detailed explanation of FIG. 10.

HOW AND WHERE TO USE THESE MACHINES

1. Invention No. 1 the "Labrador Multi-stage Piston Compressor":
   a. It can be operated by any machine that makes push & pull effort upon the piston rod 104;
   b. It can be used for compressing air and/or liquifying gases such as oxygen, natural gases, acetylene gas, and hydrogen gas;
   c. It can be use in the production of liquid hydrogen capsuls and liquid deuterium capsuls for feeding fusion power plants;
   d. It can be used to compress any gas in any location, but against all other compressor, it is the most recommendable in locations of high altitudes where the air is very thin.

2. Invention No. 2 the "Labrador Power Board System":
   a. It is used to convert the energy of the water waves into a condentrated mechanical force, such as a push & pull force, anywhere where there is water wave such as the ocean, the sea, or on the lakes, thereby avoiding the use of any fuel;
   b. It can be use to drive piston-type compressors, the piston-type water pumps, mechanical scapement wheel gears for hoists or jacks;
   c. It can be used to baffle water waves on the sea shores to prevent erosion upon the shoreline.

3. Invention No. 3 the "Type No. 1 Labrador Water-Wave-Energy Converter":
   a. It is used to convert the energy of the water waves into compressed air energy by erecting it where there are water waves in any location where the sea or ocean floor is available for foundation;
   b. Without using any fuel, it can be used directly to compress and/or to liquify industrial gases such as oxygen, hydrogen, acetylene, natural gas, and deuterium;
   c. Without using any fuel, it can be used directly to drive a gas turbine electric generator, or a gas turbine water pump or mill;
   d. Without using any fuel, it can supply compressed air energy to a central air tank at sea or inland, be it under water or underground tunnels;
   e. It can be used to baffle water waves on the sea shores to prevent erosion upon the shoreline soil;
   f. Without using fuel, it can drive directly the pneumatic tools in the factory near the seashore or at sea.

4. Invention No. 4 the "Type No. 2 Labrador Water-Wave-Energy Converter":
   a. It is used to convert the energy of the water waves into compressed air energy by floating it in any location where there are water waves regardless of the depth of water where practicable without using the ocean floor as foundation;
   b. It can be used in the same way and in the same procedures as the various uses of Invention No. 3, "Type No. 1 Labrador Water-Wave-Energy Converter" as enumerated from b to f in the above preceding paragraph.

5. Invention No. 5, No. 6, No. 7, & No. 8,—the Type No. 3, Type No. 4, Type No. 5, Type No. 6 (except the need for the ocean floor as foundation for Type No. 4) can all be used in the same way and in the same procedures as the various uses of Type No. 2 Water-Wave-Energy Converter System, which can be read in the preceding paragraphs hereof.

I claim the following new ideas for which protection by a patent is hereby respectfully requested, to wit:

1. A water-wave-energy converter system that produces storable and consumable energy in the form of compressed air, electricity, or hydrogen gas fuel out of the energy of the water waves, constructed floating out on the ocean, comprising:
   (a) a multi-stage compressor pump for compressing air and other uses, comprising:
   at least two adjoining end to end compression cylindrical chambers of equal lengths with common end walls, decreasing in diameter by approximately 30% to 50% by chamber after chamber, the last being of the least diameter;
   a circular piston of corresponding size having piston rings of appropriate types in each said compression chambers, having forward and reverse strokes in said chambers, and movable in response to the actuations of the driving piston rod;
   a long, straight, continuous, single, smooth surface, cylindrical pipe, piston rod, that passes thru the center holes of the end walls of each and all the said chambers from the first stage to and ending at the last stage, which holds and moves back and forth each said piston in all the said chambers at the same time in a synchronous movement, the full length of which starts from the connector at the driving structure—then passing thru a holder bearing—then thru the first said chamber—thru the succeeding said chambers——and ending at the bearing chamber (115) where its end portion is carried by a roller bearing to relieve the piston-rings from carrying the weight of the pistons;
   at least two circular or ball-type one-way valves set at every end wall of all the said chambers and at each of the said pistons except at the forward end wall of the said last stage chamber which has only one one-way valve, to effect the axial flow of compressed air along the length of said compressor;
   a cylindrical or ring-type air sealer, of appropriate materials, to prevents the back flow escape of compressed gas through the passage of the piston rod, set at the center holes of the end walls of each said chambers and acting on the smooth surface of said piston rod;

an oil circulation system, in the form of small pipe line with a compressed air operated oil pump, separately installed in each said chambers, to lubricate the piston rings, the cylinder walls, the air sealers, and the piston rod surface;

a pivot bearing connector at the rear end of said piston rod;

an air vent with filter to serve as an inlet of atmospheric air into the pump but prevents water spray to get into the pump;

a delivery pipe to deliver compressed gas from the last said stage of the pump to the compressed gas reservoir or storage tank;

(b) a strong power board system that directly receives and converts the kinetic energy of the water waves, by direct impact of the waves against an impact wall, into a concentrated horizontal mechanical force during ordinary weather and also in times of abundance by the violent weather as well, comprising:

an impact wall made of metal, or plastic boards, or creosoted timber logs or lumber fastened together on a strong frame to form a wide and long rectangular flat face strong solid wall to have the capability to stop the surfs, or at which the bulky and heavy water waves or surfs will directly splash to unleash or impart their enormous energies;

at least two structural steel I-Beam or creosoted timber beam which has a joint at its lower third that will automatically relax to let the beams bend to yield if over loaded, with a length of at least 10 feet to 40 feet, depending upon the characteristics of surfs in the project site, which holds together and suspends vertically the said impact wall, coupled together to act as one pendulum frame, suspended vertically by a free pivot bearing connector at its upper end with the said impact wall facing the waves at an elevation where the bottom of said wall is one foot below the lowest return cycle of the water waves and at least 6 inches clear above the ocean floor;

said joint of the pendulum beam is a free pivot pin-type, and is provided with a stopper compression face to make the said pendulum beam to stay on a straight posture, not to bend forward, on the return cycle of the water waves;

said joint of said pendulum beam is provided with a hydraulic jack system that will automatically relax to allow the said beam to bend backward to allow the over size water waves spill thru under the said impact wall;

said hydraulic jack system is composed of an oil-compression chamber, a pressurized oil storage tank, a pipe for oil passage from the said compression chamber to the said pressurized storage tank, a return pipe to deliver back the oil from the said storage tank to the said compression chamber, a one-way valve that allows the oil toe enter said oil-compression chamber upon the reverse stroke of the piston, a push-type valve switch that will bump against a stopper to open the said passage pipe for the compressed oil to escape and enter into the storage tank, and a structure on which the said jack system is mounted and connected to the back side of the said pendulum beam;

said pendulum beam is held and controlled at its upper tip by a free pin pivot connector to allow the impact wall to be freely playing forward and backward, but not sideward, by the action of the waves, and suspending the whole said pendulum assembly such that said impact wall be only 1/5 submerged at the lowest return cycle of the waves so that it will move forward;

a pair or two strong support posts, in the form of creosoted timber poles, or steel pipes, or plastic pipes, erected vertically at a distance between them enough to accomodate the length of the said impact wall, which supports and suspends vertically the whole said pendulum assembly in such a way that the said impact wall is vertical facing the water waves squarely;

each of said support posts is provided at the top with a horizontal arm structure thru which said pendulum assembly is suspended by the said free pin pivote connector;

said support posts are provided with bumpers that stops the pendulum frame when it swings too far back due to over sized surfs;

said support posts are further provided with bumpers that will react on the push-type valves of the said hydraulic jack control system to relax the oil pressure inside said jack in order to effect bending of said pendulum beam yielding to oversized surfs;

said support posts are provided with a coupling structure, in the form of a rigid horizontal truss that maintains a right-angle with the said vertical support posts to form a large vertical rectangular-framed space thru which the vertical rectangular frame formed by the impact wall and said pendulum beam assembly will be swinging back and forth;

a guy rope, securely attached to the top of each said vertical support posts, the lower end of which is securely tied tautly to the front end of said floating pipe foundation, and another guy rope attached to the top of said posts tied tautly to the rear end of same pipe foundation to keep said posts stand squarely on said foundation, while same will be oscillating due to the action of the water waves;

a driving bar, or pipe rod, connected to the said piston rod of the said multi-stage compressor and to the middle-third of said pendulum beam, that effects mechanical operation of said compressors mounted at horizontal position at each said support posts at the elevation of said driving bar;

a control bearing that holds and controls the said piston rod of said compressor on a fix elevation and keep it at a horizontal position, attached to the said support post by structural braces;

(c) a 90% submerged floating foundation that carry the joint assembly of components set forth in section (a) and (b) including other accessory components of the whole converter system, to help said system stay afloat on the ocean at any weather condition, comprising:

at least two sets of assembled horizontal pipes, parallel to each other, laid down on water perpendicular to the waves, made of impervious materials capable of floating on water for a long time, long enough—at least with a length equal to two wave-lengths of the average large surf—to minimize oscillation of the apparatus by the water-waves, at least with a diameter of 3 inches each pipe, a point within the middle-third of one set is attached by clamp to the base of one support post of said power board system in a formation that said pipes are stacked to form a vertical single pile, likewise, the same is done with the second set of pipes upon the second said support post, the number of pipes per set depends upon the weight of the whole converter system such that 90% of the floating pipe foundation assembly is submerged in water to minimize the oscillation effects of the water waves during violent weather; a coupling set of braces at the base of said support posts and at the ends of each set of pipe foundation assembly to fix the said floating foundation to be always parallel to each other and square to the power board;

a "Y" type of anchor chain or rope, the upper two ends of which are tied to the bottom tip of each of the support posts of the power board while the lower end is anchored to the sea bed—the effect of which is to make the power board always face the water waves automatically by pivoting at the sea bed while on that station;

said anchor chain is provided with an appropriate weight attached to the chain at a distance of 10 meters from the ground anchor so that it will be lifted up and down when over sized waves strike the power board, in order to provide caution to and to remove jerk from the structure;

(d) a means to store the compressed air produced by the said compressors, which is an apparatus that further serves as an independent water-wave energy converter by way of the vertical movements of the water waves, comprising:

a couple of cylindrical air storage tanks directly floating horizontally on water parallel to the lines of the water waves, spaced apart equal to one-half wave length of the average size water wave, having length equal to the horizontal length of the said impact wall, coupled together by set of braces to form a deck on top of said tanks;

said deck carries four multi-stage piston compressors as set forth in the forgoing section (a), anchored on said deck by a revolving connector that enables said compressors to turn left and right as well as up or down;

said compressors are positioned on the said deck such that two said compressors are set near the front end of the said deck facing towards the center of the deck at an angle of at least 40 to 50 degrees between the said two compressors, while the other two said compressors are set near the rear end of the said deck facing towards the center in the same spacing as the first said two compressors;

a strong post or bar that stands vertical 5 to 8 feet above said deck and extends down under water at least 25 feet below the said deck thru a hole at the center of said deck;

said strong bar is connected to the deck by a free pin connector at the main structures of the said deck that serves as pivote pin for said strong bar;

said strong bar is provided with a solid weight at its bottom tip that is heavy enough to keep the said Bar firmly at a vertical position, against the horizontal forces of the piston rods at the top;

said vertical strong bar is provided with a free pin connector at its upper tip to which the piston rods of the two said compressors on the left and the piston rods of the other two said compressors on the right are correspondingly connected on the left and on the right of said pin connector respectively;

said piston rods are made telescopic in the form of hydraulic pipes which are provided with bump switches to release the hydraulic oil when the amplitude of the waves goes beyond safe limits;

said air tank—deck assembly is made partially submerged during violent weather to save it from destruction;

a strong rope connected to the mid-point bottom right side of said deck tied to the rear bottom right end of said pipe floating foundation, and another strong rope connected to the mid-point bottom left side of the said deck tied to the rear bottom left end of said floating pipe foundation, in order to keep it near within reach of the air hoses coming from the compressors at the said power board system;

and a caudal tail, made of light thin materials on a strong frame to form a wide-face wall, attached to the middle of the rear tip of said deck by means of a strong structure arm to keep the said wide faced wall vertically submerged in water and aligned with the center line of said deck rigidly in order to keep said floating deck assembly stay perpendicular to the water waves.

2. A plurality of apparatus constructed according to said elected claim 1 that are set side-by-side by using said floating-pipe foundation to become common structure in-between sets of converters constructed in parallel forming a long line of apparatus set out floating on the ocean to supply large quantities of compressed air.

* * * * *